(12) United States Patent
Kawasaki et al.

(10) Patent No.: US 10,400,729 B2
(45) Date of Patent: Sep. 3, 2019

(54) FUEL INJECTION VALVE

(71) Applicant: Mitsubishi Electric Corporation, Tokyo (JP)

(72) Inventors: Shota Kawasaki, Tokyo (JP); Tsuyoshi Munezane, Tokyo (JP); Naoya Hashii, Tokyo (JP); Keisuke Ito, Tokyo (JP); Kyosuke Watanabe, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 351 days.

(21) Appl. No.: 14/758,300

(22) PCT Filed: Apr. 16, 2013

(86) PCT No.: PCT/JP2013/061301
§ 371 (c)(1),
(2) Date: Jun. 29, 2015

(87) PCT Pub. No.: WO2014/170956
PCT Pub. Date: Oct. 23, 2014

(65) Prior Publication Data
US 2015/0337785 A1 Nov. 26, 2015

(51) Int. Cl.
*F02M 61/04* (2006.01)
*F02M 61/18* (2006.01)
(Continued)

(52) U.S. Cl.
CPC ........ *F02M 61/04* (2013.01); *F02M 51/0682* (2013.01); *F02M 61/186* (2013.01);
(Continued)

(58) Field of Classification Search
CPC .............. F02M 61/04; F02M 51/0682; F02M 61/1813; F02M 61/1833; F02M 61/186;
(Continued)

(56) References Cited

U.S. PATENT DOCUMENTS 5,383,597 A * 1/1995 Sooriakumar ............ B05B 1/34
239/5
5,449,114 A * 9/1995 Wells ........................ B05B 1/34
239/5
(Continued)

FOREIGN PATENT DOCUMENTS

CN  101589222 A  11/2009
JP  06-312147 A  11/1994
(Continued)

OTHER PUBLICATIONS

Communication dated Aug. 30, 2016, from the Korean Intellectual Patent Office, in counterpart Korean application No. 10-2015-7019823.
(Continued)

*Primary Examiner* — Chee-Chong Lee
*Assistant Examiner* — Joseph A Greenlund
(74) *Attorney, Agent, or Firm* — Sughrue Mion, PLLC; Richard C. Turner

(57) ABSTRACT

A fuel injection valve according to the present invention has an expanded portion formed in a first injection-hole plate on an upstream side, thereby allowing positional misalignment between injection-hole portions. As a result, a radial dimension between an inner diameter-side circumferential edge of an upstream-side injection hole outlet portion and an inner diameter-side circumferential edge of a downstream-side injection hole inlet portion is not required. Thus, a plate thickness of a second injection-hole plate on a downstream side can be kept to minimum. As a result, weldability between an injection-hole plate body and a valve seat is improved.

9 Claims, 10 Drawing Sheets

(51) Int. Cl.
 *F02M 51/06* (2006.01)
 *F16K 27/10* (2006.01)
 *F16K 1/32* (2006.01)
(52) U.S. Cl.
 CPC .... *F02M 61/1813* (2013.01); *F02M 61/1833* (2013.01); *F16K 1/32* (2013.01); *F16K 27/102* (2013.01); *F02M 61/188* (2013.01); *F02M 2200/8084* (2013.01); *Y10T 137/87265* (2015.04)
(58) Field of Classification Search
 CPC ......... F02M 61/188; F02M 2200/8084; F02M 61/1853; F02M 61/1806; F02M 61/162; F02M 61/182; F02M 61/184; F02M 61/1826; F16K 1/32; F16K 27/102; Y10T 137/87265
 USPC .......................... 239/533.12, 533.13, 533.14
 See application file for complete search history.

(56) References Cited

U.S. PATENT DOCUMENTS

| | | | |
|---|---|---|---|
| 5,492,277 A | 2/1996 | Tani et al. | |
| 5,553,789 A * | 9/1996 | Findler | F02M 61/168 239/548 |
| 5,785,254 A * | 7/1998 | Zimmermann | F02M 61/162 239/490 |
| 5,924,634 A * | 7/1999 | Arndt | B05B 1/34 239/533.12 |
| 6,050,507 A * | 4/2000 | Holzgrefe | F02M 51/0671 239/585.1 |
| 6,499,674 B2* | 12/2002 | Ren | F02M 61/1853 239/407 |
| 6,616,072 B2* | 9/2003 | Harata | F02M 51/0678 239/533.12 |
| 6,783,085 B2* | 8/2004 | Xu | F02M 61/162 239/463 |
| 6,826,833 B1* | 12/2004 | Maier | B23P 15/16 239/463 |
| 6,848,635 B2* | 2/2005 | Xu | F02M 61/162 239/502 |
| 6,854,670 B2* | 2/2005 | Sumisha | F02M 51/0678 239/468 |
| 7,104,475 B2* | 9/2006 | Goenka | F02M 61/1806 239/533.12 |
| 7,124,963 B2* | 10/2006 | Goenka | B05B 1/14 239/504 |
| 7,185,831 B2* | 3/2007 | Goenka | F02M 61/1806 239/494 |
| 7,472,838 B2* | 1/2009 | Omura | F02M 61/1853 239/533.12 |
| 7,669,789 B2* | 3/2010 | Hung | F02M 61/1813 239/533.12 |
| 8,016,214 B2* | 9/2011 | Higuma | B21K 1/20 239/533.12 |
| 8,567,701 B2* | 10/2013 | Hashii | F02M 51/0682 239/490 |
| 8,714,465 B2* | 5/2014 | Heyse | F02M 61/1853 239/533.12 |
| 9,371,808 B2* | 6/2016 | Hashii | F02M 61/186 |
| 2002/0092930 A1* | 7/2002 | Itatsu | F02M 61/1846 239/533.3 |
| 2003/0155449 A1* | 8/2003 | Abe | F02B 23/104 239/585.2 |
| 2004/0144870 A1* | 7/2004 | Tani | F02M 61/1853 239/585.1 |
| 2004/0163254 A1* | 8/2004 | Miyagawa | B21D 53/84 29/890.142 |
| 2006/0200988 A1* | 9/2006 | Hamann | B05B 1/14 29/890.143 |
| 2009/0200402 A1* | 8/2009 | Gesk | F02M 61/1853 239/533.12 |
| 2009/0206181 A1* | 8/2009 | Arndt | F02M 61/1833 239/533.12 |
| 2009/0242668 A1* | 10/2009 | Higuma | B21K 1/20 239/584 |
| 2010/0229385 A1* | 9/2010 | Higuma | B21J 5/10 29/888.4 |
| 2010/0288857 A1 | 11/2010 | Hashii et al. | |
| 2013/0327855 A1* | 12/2013 | Mosser | F02M 61/1833 239/601 |
| 2015/0233333 A1* | 8/2015 | Hashii | F02M 61/186 239/562 |

FOREIGN PATENT DOCUMENTS

| | | |
|---|---|---|
| JP | 2002-210392 A | 7/2002 |
| JP | 2004-169572 A | 6/2004 |
| JP | 2004-360477 A | 12/2004 |
| JP | 2005-127186 A | 5/2005 |
| JP | 2006-220029 A | 8/2006 |
| JP | 2007-040111 A | 2/2007 |
| JP | 2009-197682 A | 9/2009 |
| JP | 2010-265865 A | 11/2010 |

OTHER PUBLICATIONS

International Search Report for PCT/JP2013/061301 dated Jul. 23, 2013.

Communication dated Feb. 4, 2017, from the State Intellectual Property Office of People's Republic of China in counterpart Application No. 201380075634.7, 12 pages total with translation.

\* cited by examiner

FUEL INJECTION VALVE

CROSS REFERENCE TO RELATED APPLICATIONS

This application is a National Stage of International Application No. PCT/JP2013/061301 filed Apr. 16, 2013, the contents of all of which are incorporated herein by reference in their entirety.

TECHNICAL FIELD

The present invention relates to a fuel injection valve to be used for an internal combustion engine, in particular, a fuel injection valve including an injection-hole plate body including laminated two injection-hole plates arranged on a downstream side of a valve seat.

BACKGROUND ART

In recent years, due to tightened regulations on gas emission from an internal combustion engine of an automobile or the like, a fuel spray injected from a fuel injection valve is required to be atomized.

In particular, various examinations have been conducted on the atomization of the fuel spray.

For example, there is known a fuel injection valve including an injection-hole plate formed by laminating an upstream-side plate and a downstream-side plate. An inner diameter-side inner wall surface of an upstream-side injection hole formed through the upstream-side plate is formed continuous with an inner diameter-side inner wall surface of a downstream-side injection hole formed through the downstream-side plate. A guide portion for guiding a fuel flow toward the inner diameter-side inner wall surface of the downstream-side injection hole is formed at least on an inner wall surface of the upstream-side injection hole on an outer diameter side (see Patent Literature 1).

In the fuel injection valve described above, the fuel reaching the vicinity of the outer diameter-side inner wall surface of an inlet-side opening edge of the upstream-side injection hole is subjected to a guiding action of the guide portion to be guided to the inner diameter-side inner wall surface of the downstream-side injection hole. In this manner, the fuel is formed into a liquid film along the inner wall surface of the downstream-side injection hole, and is then atomized by the injection.

Further, there is also known a fuel injection valve in which second cylindrical holes are formed through a downstream-side injection-hole plate to be held in communication with a plurality of first cylindrical holes formed through an upstream-side injection-hole plate in a one-to-one relationship, and each of the second cylindrical holes has a larger hole diameter than that of the first cylindrical holes and is inclined at a predetermined angle with respect to the first cylindrical hole (see Patent Literature 2).

In the fuel injection valve, a fuel liquid passing through the first cylindrical holes reliably collides against inner wall surfaces of the inclined second cylindrical holes to be injected in a thin liquid-film form along the inner wall surfaces while spreading on the inner wall surfaces of the second cylindrical holes to both sides in a circumferential direction, and thus the fuel liquid is atomized.

CITATION LIST

Patent Literature

[PTL 1] JP 2005-127186 A
[PTL 2] JP 2004-169572 A

SUMMARY OF INVENTION

Technical Problems

The fuel injection valve disclosed in Patent Literature 1 premises that the inner diameter-side inner wall surface of the upstream-side injection hole and that of the downstream-side injection hole are continuous. However, there is a problem in that it is practically difficult to form the inner diameter-side inner wall surfaces continuous in terms of processing due to factors such as a difference in dimension between injection-hole diameters, a shift between positions at which the injection holes are processed, and positional misalignment between the upstream-side plate and the downstream-side plate.

Further, in particular, when the inner diameter-side inner wall surface of the upstream-side injection hole shifts radially inward with respect to the inner diameter-side inner wall surface of the downstream-side injection hole, the upstream-side injection hole is partially closed to affect an injection amount.

Further, under high-temperature and negative-pressure environments, flashing occurs in a portion from a downstream side of a valve-seat portion, in which a flow path is narrowed, to the upstream-side injection hole to become a gas-liquid two-phase flow. Therefore, a pressure loss at the time of passage through the downstream-side injection hole increases as compared to the case of a liquid single-phase flow. As a result, the injection amount tends to be reduced.

When the upstream-side injection hole is long, the pressure loss further increases. Therefore, a change in injection amount depending on an atmosphere becomes greater.

Therefore, a plate thickness of the upstream-side plate is desired to be reduced so as to shorten the upstream-side injection hole. However, when the upstream-side plate is too thin, a portion of the upstream-side plate, which is located on the inner diameter-side of a welding portion, is deformed in a direction of rising from the downstream-side plate due to thermal effects at the time of welding between the valve seat and the upstream-side plate.

It is difficult to control the deformation to be constant. Correspondingly, shapes of the upstream-side injection holes are fluctuated. Therefore, there is a problem in that an injection angle, a spray angle, and an atomized particle diameter are fluctuated in each sample.

In the fuel injection valve disclosed in Patent Literature 2, the two injection holes are formed at different inclination angles. The flow along the inner wall surface of the downstream-side injection holes is formed without necessarily forming the inner diameter-side inner wall surfaces continuous.

In order to prevent a flow rate from being lowered due to the above-mentioned interference between the injection holes, however, a radial dimension is required to be ensured between an inner diameter-side circumferential edge of an upstream-side injection hole outlet portion and an inner diameter-side circumferential edge of a downstream-side injection hole inlet portion. A length over which the fuel passing through the upstream-side injection hole flows along the downstream-side injection hole inner wall is reduced by the dimension. When the length is too short, the fuel is injected before the liquid film spreads along the downstream-side injection hole inner wall. Thus, the atomization is inhibited.

In a case where the downstream-side plate is formed to have a large thickness as measures to solve the inconvenience as described above, a depth at which the valve seat is welded to the upstream-side injection-hole plate and the downstream-side injection-hole plate becomes larger. Thus, an output of a heat source is required to be increased correspondingly.

As a result, there arise the above-mentioned problem of the deformation of the upstream-side injection-hole plate and a problem of deformation of an abutment portion of the valve seat against a valve element to degrade valve oil-tightness.

The present invention has been made to solve the problems described above, which may occur in an injection-hole plate body including laminated injection-hole plates, and has an object to provide a fuel injection valve capable of stabilizing an injection amount and equalizing an injection angle, a spray angle, and an atomized particle diameter, and the like.

Solution to Problems

According to one embodiment of the present invention, there is provided a fuel injection valve, including:
a valve seat;
a valve element arranged so as to be opposed to the valve seat and being capable of reciprocating along a central axis line; and
an injection-hole plate body being fixed to the valve seat by welding and having a plurality of injection holes formed therethrough,
the fuel injection valve being configured such that a fuel passes through a clearance between the valve seat and the valve element to be injected through the plurality of injection holes, wherein:
the injection-hole plate body includes:
a first injection-hole plate having a first injection-hole portion and an expanded portion in communication with the first injection-hole portion; and
a second injection-hole plate being laminated on the first injection-hole plate on its downstream side in communication with the expanded portion and having a second injection-hole portion inclined from the expanded portions in a direction away from the central axis line along the downstream side;
an inner diameter-side inner wall surface of the second injection-hole portion at least partially falls within a projection plane of the first injection-hole portion;
an outlet-side opening of the first injection-hole portion is encompassed in an inlet-side opening of the expanded portion; and
a minimum flow-path area of the first injection-hole portion for the fuel is equal to or smaller than a minimum flow-path area of the second injection-hole portion and a minimum flow-path area of the inlet-side opening of the expanded portion, and is smaller than a minimum flow-path sectional area of the expanded portion.

Advantageous Effects of Invention

In the fuel injection valve according to the one embodiment of the present invention, the inner diameter-side inner wall surface of the second injection-hole portion at least partially falls within the projection plane of the first injection-hole portion. Therefore, the fuel passing through the first injection-hole portion is pressed against the inner wall surface of the second injection-hole portion to be formed into a thin film. In this manner, atomization after the injection can be achieved.

Further, the outlet-side opening of the first injection hole is encompassed in the inlet-side opening of the expanded portion. The minimum flow-path area of the first injection-hole portion for the fuel is equal to or smaller than the minimum flow-path area of the second injection-hole portion and the minimum flow-path area of the inlet-side opening of the expanded portion, and is smaller than the minimum flow-path sectional area of the expanded portion. Therefore, the interference between the first injection-hole portion and the second injection-hole portion due to a dimension fluctuation generated at the time of processing can be prevented to suppress a reduction in injection amount.

Further, by forming the expanded portion, positional misalignment between the injection-hole portions is allowed. As a result, a radial dimension between an inner diameter-side circumferential edge of an upstream-side injection hole outlet portion and an inner diameter-side circumferential edge of a downstream-side injection hole inlet portion is not required. Thus, a plate thickness of the second injection-hole plate on the downstream side can be kept to minimum. As a result, weldability between the injection-hole plate body and the valve seat is improved.

Further, the expanded portion is formed on the downstream side of the first injection-hole plate. Thus, the first injection-hole portion can be shortened without reducing the plate thickness of the first injection-hole plate. Thus, a reduction in injection amount due to a change in atmosphere such as pressure or temperature inside the first injection-hole portion can be suppressed while ensuring such a plate thickness that the deformation of the first injection-hole plate is prevented at the time of welding between the valve seat and the injection-hole plate body.

DESCRIPTION OF EMBODIMENTS

Figure 1:
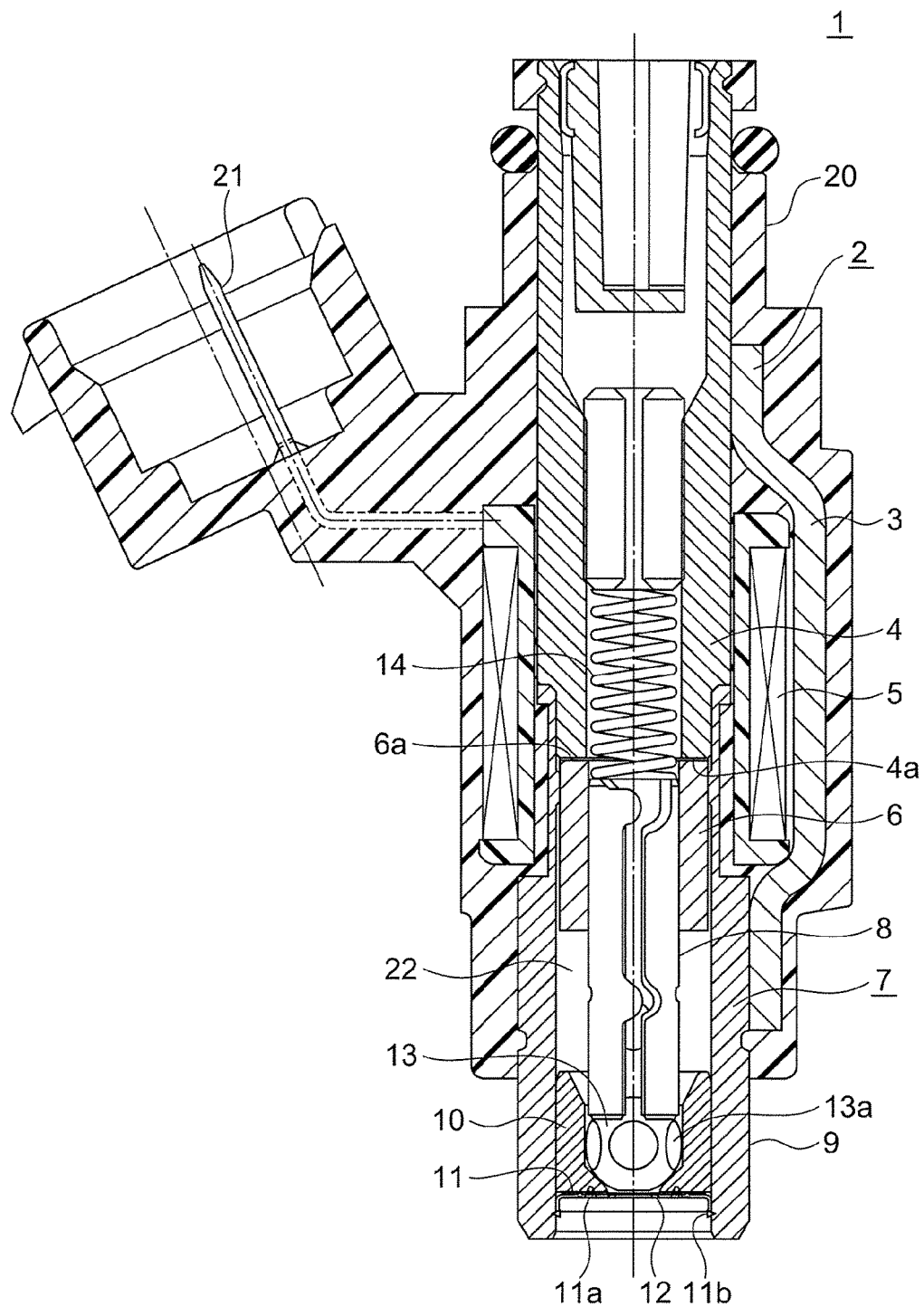
FIG. 1 is a sectional view illustrating the fuel injection valve according to a first embodiment of the present invention.

Referring to the accompanying drawings, a fuel injection valve according to embodiments of the present invention is described below. In the drawings, the same or corresponding components and parts are denoted by the same reference symbols for description.

First Embodiment

Figure 2:
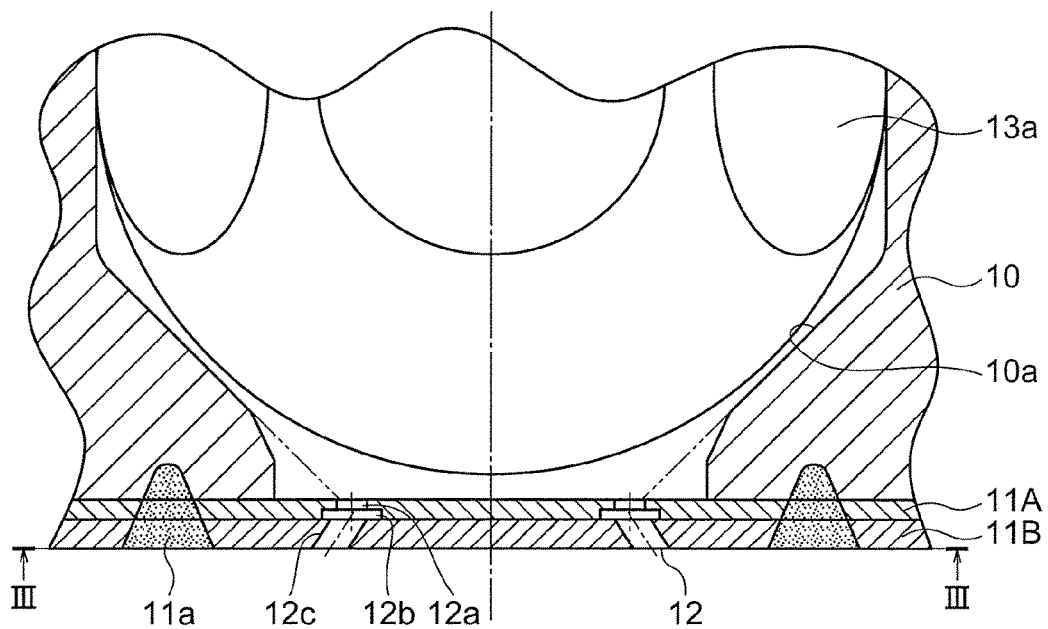
FIG. 2 is an enlarged view illustrating a main part of the fuel injection valve illustrated in FIG. 1.

FIG. 1 is a sectional view illustrating a fuel injection valve 1 according to a first embodiment of the present invention, and FIG. 2 is an enlarged view illustrating a distal end portion of the fuel injection valve 1 illustrated in FIG. 1.

The fuel injection valve 1 includes a solenoid device 2, a valve device 7 operated by driving the solenoid device 2, and a case 20 that covers the solenoid device 2 and the valve device 7.

The solenoid device 2 includes a housing 3 that is a yoke portion of a magnetic circuit, a core 4 having a cylindrical shape arranged inside of the housing 3, a coil 5 surrounding the core 4, an armature 6 having a cylindrical shape arranged to be able to come into contact with and move away from a lower end surface 4a of the core 4 on a downstream side of the core 4, a compression spring 14 housed inside the core 4, and a connector 21 that is electrically connected to the coil 5 and has an externally exposed distal end portion.

The valve device 7 includes a valve element 8 having a cylindrical shape with a ball portion 13 formed at a distal end portion thereof, a valve main body 9 having a cylindrical shape, which is press-fitted into and welded to an outer-circumferential side surface of a lower part of the core 4, a valve seat 10 press-fitted into a lower end portion of the valve main body 9, and an injection-hole plate body 11, which is surface-joined to a downstream-side end surface of the valve seat 10 by welding at a welding portion 11a. After being press-fitted into the valve main body 9 through a downstream-side end portion thereof, the valve seat 10 that is integrated with the injection-hole plate body 11 at the welding portion 11a is coupled to the valve main body 9 by welding at a welding portion 11b of a bent outer-circumferential edge portion of the injection-hole plate body 11.

Through the injection-hole plate body 11, a plurality of injection holes 12 passing in a plate-thickness direction are formed at intervals along a circumferential direction.

The valve seat 10 has a seat surface 10a reduced in inner diameter toward the downstream side.

Figure 3:
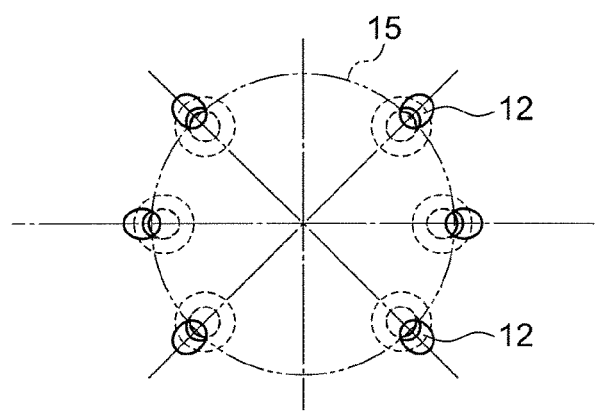
FIG. 3 is a front view of the injection-hole plate body illustrated in FIG. 2, which is taken along the line III-III as viewed in a direction of the arrows.

As illustrated in FIG. 3, the injection holes 12 are formed equiangularly along a virtual circle 15 on which a virtual conical shape formed to extend toward the downstream side along the seat surface 10a and an upstream-side surface of the injection-hole plate body 11 cross each other.

The injection-hole plate body 11 is formed by laminating a first injection-hole plate 11A on an upstream side and a second injection-hole plate 11B on a downstream side.

Each of the injection holes 12 includes a first injection-hole portion 12a formed in the first injection-hole plate 11A, an expanded portion 12b formed in the first injection-hole plate 11A to be held in communication with the first injection-hole portion 12a and enlarged in a radial direction, and a second injection-hole portion 12c formed through the second injection-hole plate 11B to be held in communication with the expanded portion 12b.

Figure 4:
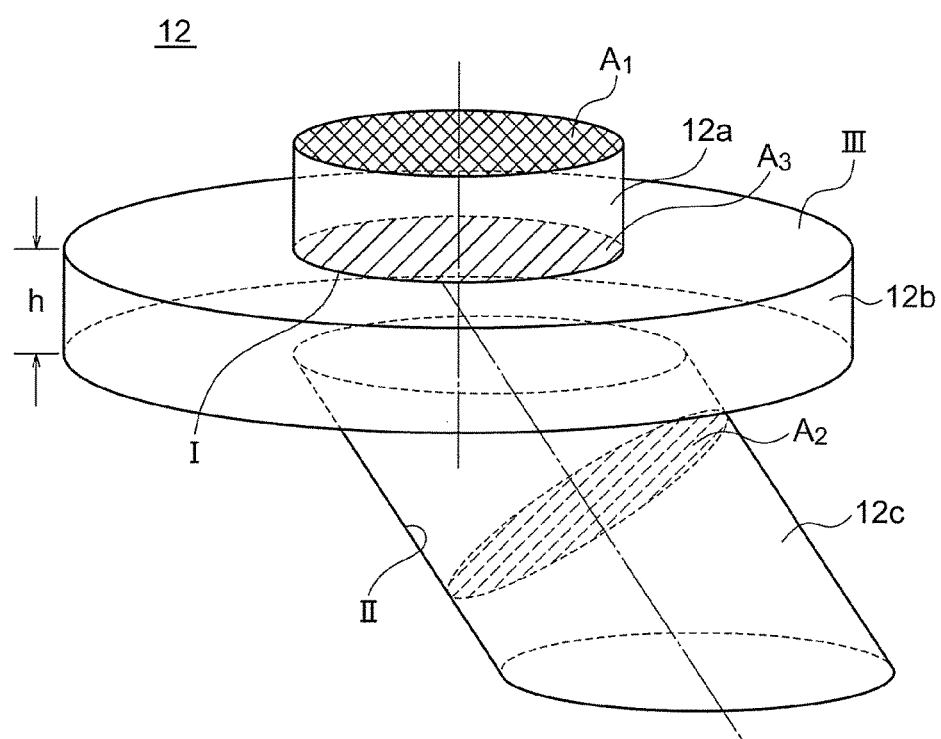
FIG. 4 is a perspective view illustrating the injection hole illustrated in FIG. 2.

FIG. 4 is a perspective view illustrating the injection hole 12 illustrated in FIG. 2.

The second injection-hole portion 12c is inclined in a direction away from an axial line of the expanded portion 12b of the first injection-hole plate 11A toward the downstream side for a fuel.

In the injection hole 12, an inner diameter-side inner wall surface II of the second injection-hole portion 12c (inner wall surface on a side opposed to an outlet-side opening I of the first injection-hole portion 12a) falls within a projection plane of the first injection-hole portion 12a.

Further, the injection hole 12 is formed so that an inlet-side opening III of the expanded portion 12b encompasses the entire outlet-side opening I of the first injection-hole portion 12a.

Figure 5:
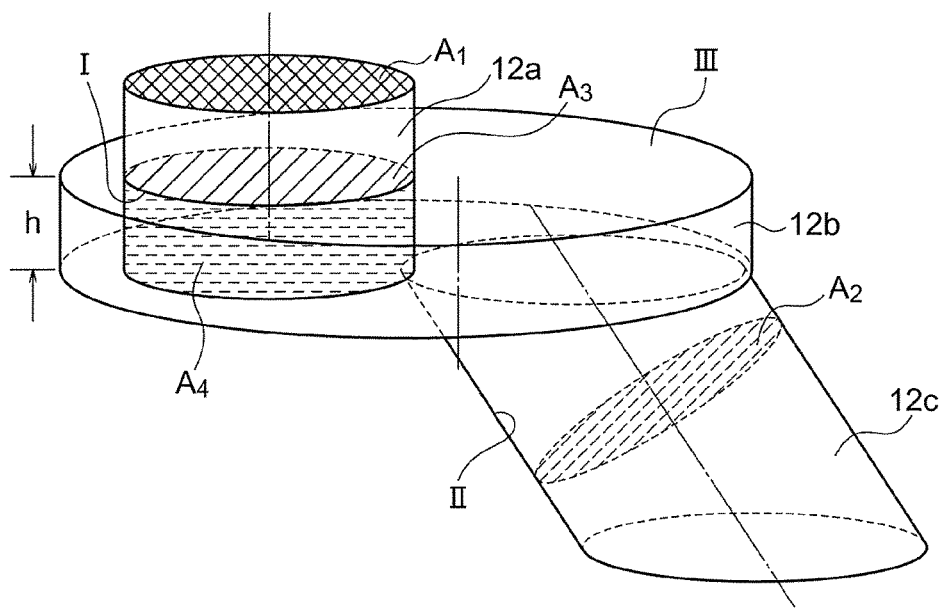
FIG. 5 is a perspective illustrating the injection hole where the first injection-hole portion and the second injection-hole portion are formed to be positionally misaligned.

In the injection hole 12, the first injection-hole portion 12a and the second injection-hole portion 12c may be formed to be positionally misaligned in a horizontal direction with respect to the expanded portion 12b, as illustrated in FIG. 5, for example.

In this embodiment, when a minimum flow-path area of the first injection-hole portion 12a (area obtained when the first injection-hole portion 12a is cut in a direction perpendicular to the axial line of the first injection-hole portion 12a) is denoted by $A_1$, a minimum flow-path area of the second injection-hole portion 12c (area obtained when the second injection-hole portion 12c is cut in a direction perpendicular to an axial line of the second injection-hole portion 12c) is denoted by $A_2$, and an area of a coupling portion between the first injection-hole portion 12a and the expanded portion 12b (which is also an area of the outlet-side opening I of the first injection-hole portion 12a) is denoted by $A_3$, relationships of $A_1 \leq A_2$ and $A_1 \leq A_3$ are both satisfied.

Further, the minimum flow-path area $A_1$ of the first injection-hole portion 12a and a minimum flow-path area $A_4$ of the expanded portion 12b have a relationship of $A_1 < A_4$.

Here, the minimum flow-path area $A_4$ of the expanded portion 12b has a value obtained by multiplying a length of an outer circumference of the outlet-side opening I of the first injection-hole portion 12a by a height h of the expanded portion 12b.

As illustrated in FIG. 5, when the first injection-hole portion 12a has a cylindrical shape, the minimum flow-path area $A_4$ is obtained by the length of the outer circumference of the outlet-side opening I of the first injection-hole portion 12a ($\pi$D (diameter of the outlet-side opening I))×h, and $A_1$ is $\pi D^2/4$. Therefore, the height h of the expanded portion 12b only needs to be ¼ of the outlet-side opening I of the first injection-hole portion 12a or larger so that the expanded portion 12b ensures the minimum flow-path area $A_4$ of the expanded portion 12b or larger.

Next, an operation of the fuel injection valve 1 having the configuration described above is described.

When an operation signal is transmitted from a control device for an internal combustion engine to a driving circuit for the fuel injection valve 1, the coil 5 is energized with a current through the connector 21. As a result, magnetic flux is generated in the magnetic circuit including the armature 6, the core 4, the housing 3, and the valve main body 9.

As a result, the armature 6 is operated to be attracted toward the core 4 against an elastic force of the compression spring 14. Then, an upper end surface 6a of the armature 6 comes into abutment against the lower end surface 4a of the core 4. The valve element 8 having a structure integral with the armature 6 is moved away from the seat surface 10a having a conical shape to form a clearance.

Simultaneously with the formation of a clearance, the fuel in the fuel passage 22 passes over chamfered portions 13a of the ball portion 13 formed at the distal end portion of the valve element 8 and through the above-mentioned clearance to be injected into an intake pipe (not shown) of the internal combustion engine through the injection holes 12.

Subsequently, when an operation stop signal is transmitted from the control device for the internal combustion engine to the driving circuit for the fuel injection valve 1, the energization of the coil 5 with a current is stopped through the connector 21. The magnetic flux in the magnetic circuit is reduced to move the upper end surface 6a of the armature 6 away from the lower end surface 4a of the core 4 due to the elastic force of the compression spring 14 that presses the valve element 8 in a valve-closing direction. As a result, the clearance between the valve element 8 and the seat surface 10a is brought into a closed state, thereby terminating the fuel injection.

According to the fuel injection valve 1 described above, in the injection hole 12, the inner diameter-side inner wall surface II of the second injection-hole portion 12c at least partially falls within the projection plane of the first injection-hole portion 12a.

Therefore, the fuel flowing out of the first injection-hole portion 12a passes through the expanded portion 12b to collide against the inner diameter-side inner wall surface II of the second injection-hole portion 12c to become a liquid film along the inner wall surface of the second injection-hole portion 12c. The atomized fuel is injected into the intake pipe. As a result, vaporizability of the fuel is improved to reduce fuel consumption.

Further, the injection hole 12 is formed so that the expanded portion 12b encompasses the entire outlet-side opening I of the first injection-hole portion 12a.

Further, assuming the minimum flow-path area $A_1$ of the first injection-hole portion 12a, the minimum flow-path area $A_2$ of the second injection-hole portion 12c, and the area $A_3$ of the coupling portion between the first injection-hole portion 12a and the expanded portion 12b, the relationships of $A_1 \leq A_2$ and $A_1 \leq A_3$ are both satisfied.

Still further, the minimum flow-path area $A_1$ of the first injection-hole portion 12a and a minimum flow-path area $A_4$ of the expanded portion 12b have the relationship of $A_1 < A_4$.

Therefore, even when the first injection-hole portion 12a is positionally misaligned with respect to the second injection-hole portion 12c within the inlet-side opening III of the expanded portion 12b, the first injection-hole portion 12a is not closed. Further, the fuel-path area in the expanded portion 12b and that in the second injection-hole portion 12c are not reduced.

Thus, when a shape and a depth of the expanded portion 12b are determined in consideration of the positional fluctuation in processing of the first injection-hole portion 12a and the second injection-hole portion 12b and positional misalignment between the first injection-hole plate 11A and the second injection-hole plate 11B, the injection amount can be prevented from being reduced due to the interference between the first injection-hole portion 12a and the second injection-hole portion 12c.

Further, when the area of the inlet-side opening III of the expanded portion 12b is set large, necessary effects are obtained without increasing the height of the expanded portion 12b. Thus, press molding for forming the expanded portion 12b is facilitated.

Although the first injection-hole portions 12a and the expanded portions 12b correspond to each other in one-by-one manner in the embodiment described above, the adjacent expanded portions 12b may be connected to form a single expanded portion for a plurality of the first injection holes 12a.

Further, in the fuel injection valve disclosed in Patent Literature 2, the radial dimension is required to be ensured between the inner diameter-side circumferential edge of the upstream-side injection hole outlet portion and the inner diameter-side circumferential edge of the downstream-side injection hole inlet portion so as to prevent the flow rate from being lowered due to the above-mentioned interference between the injection holes. The length over which the fuel passing through the upstream-side injection hole along the downstream-side injection hole inner wall is reduced by the dimension. When the length is too short, the fuel is injected before the liquid film spreads along the downstream-side injection hole inner wall. Therefore, the plate is required to be formed thick.

On the other hand, the above-mentioned distance can be minimized by forming the outlet-side opening of the first injection-hole portion 12a to be encompassed within the inlet-side opening of the expanded portion 12b. Therefore, by keeping the plate thickness of the second injection-hole plate 11B to minimum, an output of a heat source at the time of welding between the injection-hole plate body 11 and the valve seat 10 can be reduced.

In this manner, a fear of degrading the valve oil-tightness due to the deformation of the first injection-hole plate 11A or the deformation of the seat surface 10a of the valve seat 10 or the like is eliminated.

Further, the expanded portion 12b is formed on the downstream side of the first injection-hole portion 12a of the first injection-hole plate 11A. Therefore, the first injection-hole portion 12a can be shortened without reducing the plate thickness of the first injection-hole plate 11A.

In this manner, the reduction in injection amount, which is caused by a change in atmosphere such as pressure or temperature due to the long first injection-hole portion 12a, can be suppressed while ensuring such a plate thickness that the deformation of the first injection-hole plate 11A is prevented at the time of welding between the valve seat 10 and the first injection-hole plate 11A.

Further, the first injection-hole portion 12a is formed to extend in a direction perpendicular to the surface of the first injection-hole plate 11A. Therefore, the length of the first injection-hole portion 12a can be kept to minimum. As a result, the reduction in injection amount due to the above-mentioned change in atmosphere such as pressure or temperature can be further suppressed.

Second Embodiment

Figure 6:
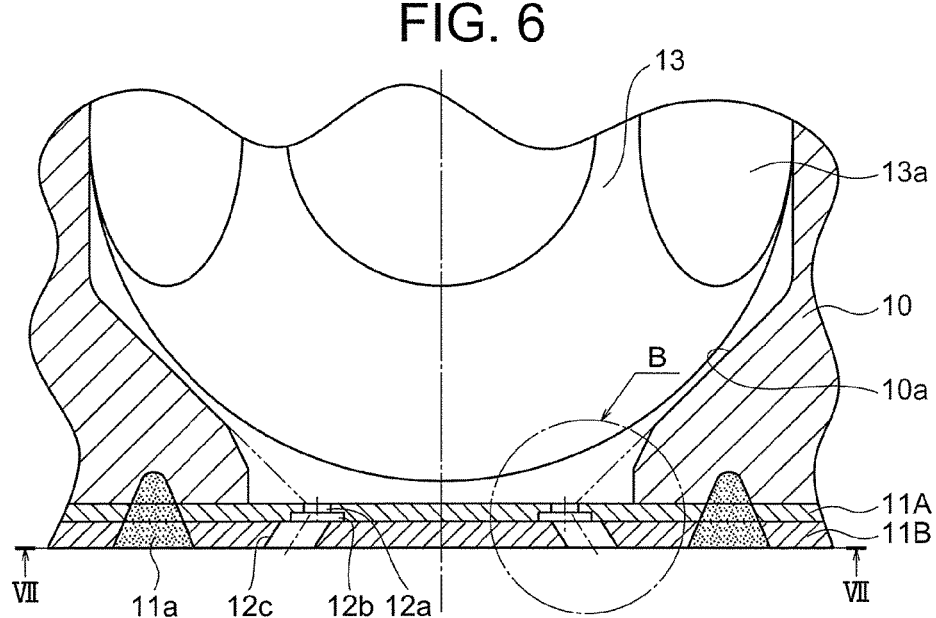
FIG. 6 is a sectional view illustrating a main part of the fuel injection valve according to a second embodiment of the present invention.
Figure 7:
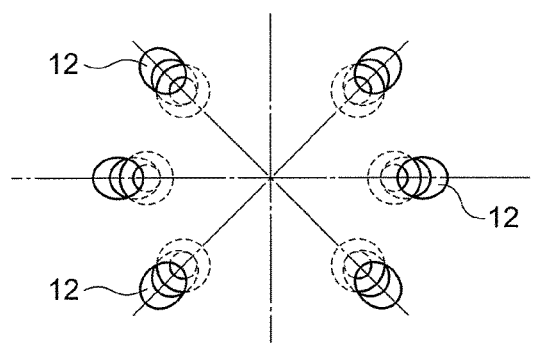
FIG. 7 is a front view of the injection-hole plate body illustrated in FIG. 6, which is taken along the line VII-VII as viewed in a direction of the arrows.
Figure 8:
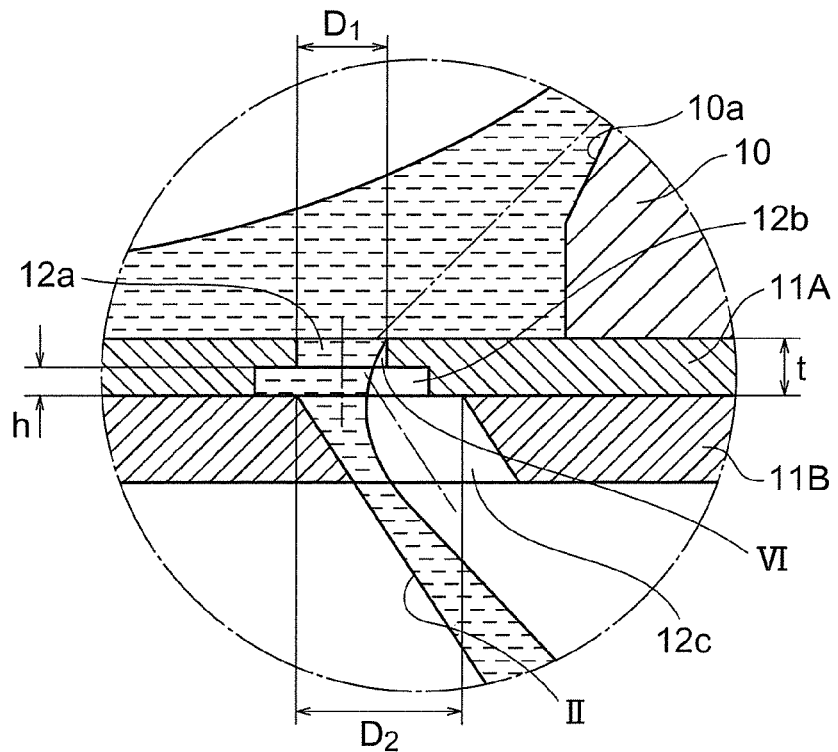
FIG. 8 is an enlarged view illustrating a portion B illustrated in FIG. 6.

FIG. 6 is a sectional view illustrating a main part of the fuel injection valve 1 according to a second embodiment of the present invention, FIG. 7 is a front view of the injection-hole plate body 11 illustrated in FIG. 6, which is taken along the line VII-VII as viewed in a direction of the arrows, and FIG. 8 is an enlarged view illustrating a portion B illustrated in FIG. 6.

A fuel flow that separates at the inlet of the first injection-hole portion 12a (portion VI illustrated in FIG. 8) has a flat shape. When the first injection-hole portion 12a is too long, however, the fuel returns along the inner wall of the first injection-hole portion 12a to disturb the flat shape.

On the other hand, in this embodiment, the length of the first injection-hole portion 12a is kept to minimum by forming the first injection-hole portion 12a perpendicularly, as in the first embodiment. When the plate thickness of the first plate 11A is denoted by t, the diameter of the first injection-hole portion 12a is denoted by D1, and the height of the expanded portion 12b is denoted by h, a value of (t−h)/D1 is reduced. As a result, the fuel flowing into the first injection-hole portion 12a collides against the inner diameter-side inner wall surface II of the second injection-hole portion 12c in the radial direction while keeping the flat shape.

In this manner, the flow to spread the liquid film along the inner wall of the second injection-hole portion 12c is intensified to efficiently form the fuel into a thin film. Therefore, an atomization promoting effect is obtained.

Figure 9:
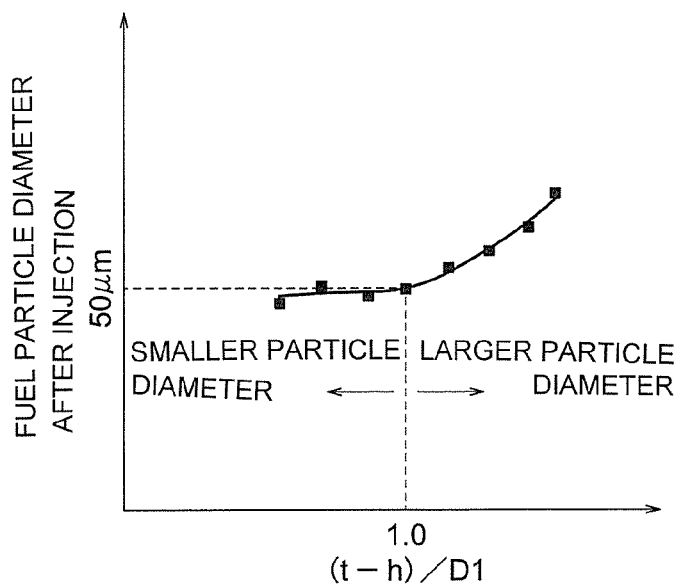
FIG. 9 is a characteristic chart showing the relationship between (t−h)/D1 and the fuel particle diameter after the injection in the fuel injection valve illustrated in FIG. 6.

In particular, the inventor of this application experimentally examined a relationship between (t−h)/D1 and a fuel particle diameter after the injection. FIG. 9 is a characteristic chart showing the relationship. It is found that the above-mentioned atomization effect is obtained when (t−h)/D1<1 is satisfied.

Specifically, it is found that a great effect is obtained by increasing the diameter D1 of the first injection-hole portion 12a and the height h of the expanded portion 12b with respect to the plate thickness t of the first plate 11A.

Further, in order to maintain a predetermined flow rate, the injection-hole diameter is limited in the fuel injection valve 1.

On the other hand, the injection-hole plate body 11 is formed by laminating the first injection-hole plate 11A on the upstream side and the second injection-hole pate 11B on the downstream side. The flow rate of the fuel is determined depending on the diameter of the first injection-hole portion 12a. Therefore, the diameter of the second injection-hole portion 12c can be set freely.

In the injection-hole plate body 11, by setting a diameter D2 of the second injection-hole portion 12c larger than the diameter D1 of the first injection-hole portion 12a, the liquid film can be spread wider when the fuel passing through the injection-hole portion 12a collides against the inner wall surface of the second injection-hole portion 12c. Thus, the atomization of the fuel after the injection, which is realized by thinning the liquid film, can be further enhanced.

Third Embodiment

Figure 10:
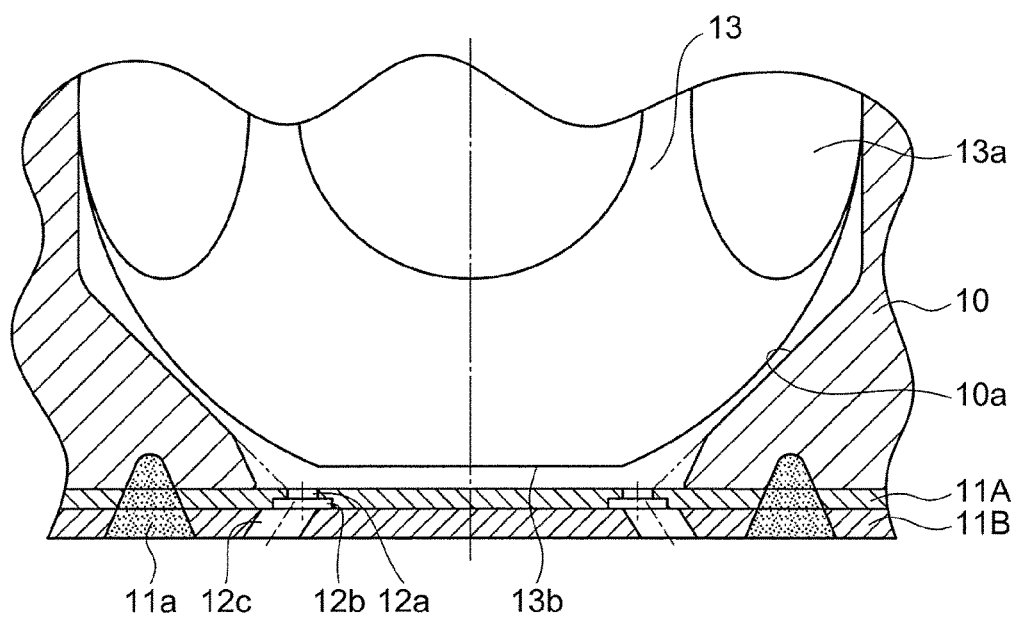
FIG. 10 is a sectional view illustrating a main part of the fuel injection valve according to a third embodiment of the present invention.

FIG. 10 is a sectional view illustrating a main part of the fuel injection valve 1 according to a third embodiment of the present invention.

In this embodiment, the ball portion 13 of the valve element 8 having the cylindrical shape has a flat portion 13b formed at a distal end portion so as to be opposed to the first injection-hole plate 11A.

The remaining configuration is the same as that of the fuel injection valve 1 according to the second embodiment.

In this embodiment, the ball portion 13 has the flat portion 13b at the distal end portion. Therefore, a dead volume can be reduced while avoiding the interference between the distal end portion of the valve element 8 and the first injection-hole plate 11A when the valve is in a closed state. Thus, an evaporated fuel amount in the dead volume under a high temperature and a negative pressure is reduced. As a result, a change in injection amount (static flow rate or dynamic flow rate), which is caused along with a change in atmosphere, can be suppressed.

Fourth Embodiment

Figure 11:
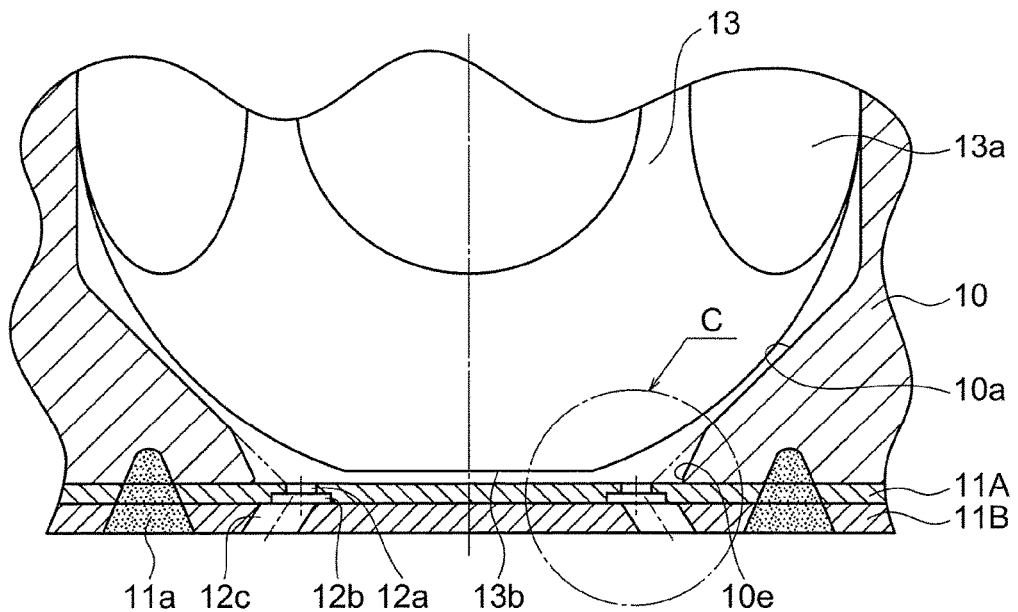
FIG. 11 is a sectional view illustrating a main part of the fuel injection valve 1 according to a fourth embodiment of the present invention.
Figure 12:
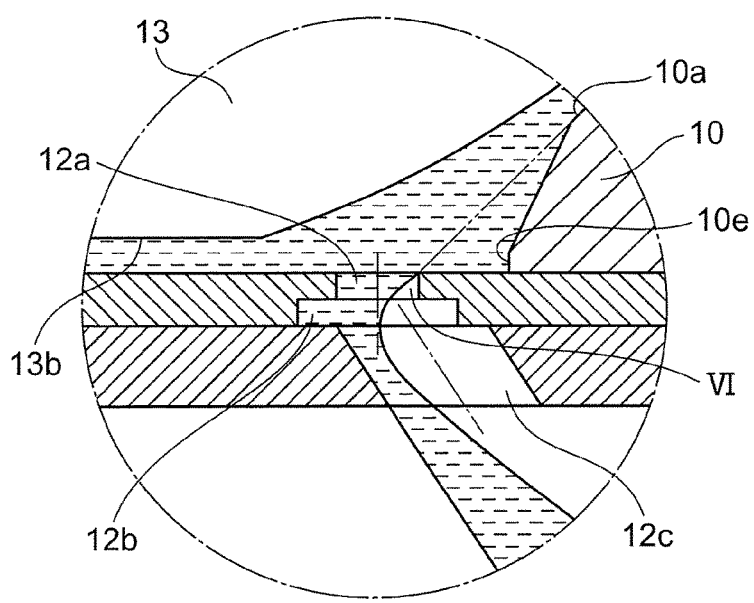
FIG. 12 is an enlarged view illustrating a portion C illustrated in FIG. 11.

FIG. 11 is a sectional view illustrating a main part of the fuel injection valve 1 according to a fourth embodiment of the present invention, and FIG. 12 is an enlarged view illustrating a portion C illustrated in FIG. 11.

In this embodiment, the first injection-hole portion 12a of the first injection-hole plate 11A is formed on a radially inner side of an innermost diameter portion 10e of the valve seat 10 and on a radially outer side of the flat portion 13b of the ball portion 13.

The remaining configuration is the same as that of the fuel injection valve 1 according to the third embodiment.

For the fuel flow in a cavity surrounded by the ball portion 13, the valve seat 10, and the first injection-hole plate 11A, a cavity flow-path area is suddenly reduced after reaching the first injection-hole plate 11A to the flat portion 13b.

In this embodiment, the first injection-hole portion 12a is formed on the radially inner side of the innermost diameter portion 10e of the valve seat 10 and on the radially outer side of the flat portion 13b of the ball portion 13.

Therefore, a flow returned toward the first injection-hole portion 12a after the collision between the fuels passing radially inward through the respective injection-hole portions 12a can be suppressed. Therefore, the flows into the first injection-hole portions 12a in one direction can be intensified.

As a result, the separation of the fuel, which occurs at the inlet-side opening of the first injection-hole portion 12a (portion VI illustrated in FIG. 12), is intensified. Then, the liquid film spreads along the inner wall of the second injection-hole portion 12c to become a thin film. As a result, the atomization after the injection is promoted.

Fifth Embodiment

Figure 13:
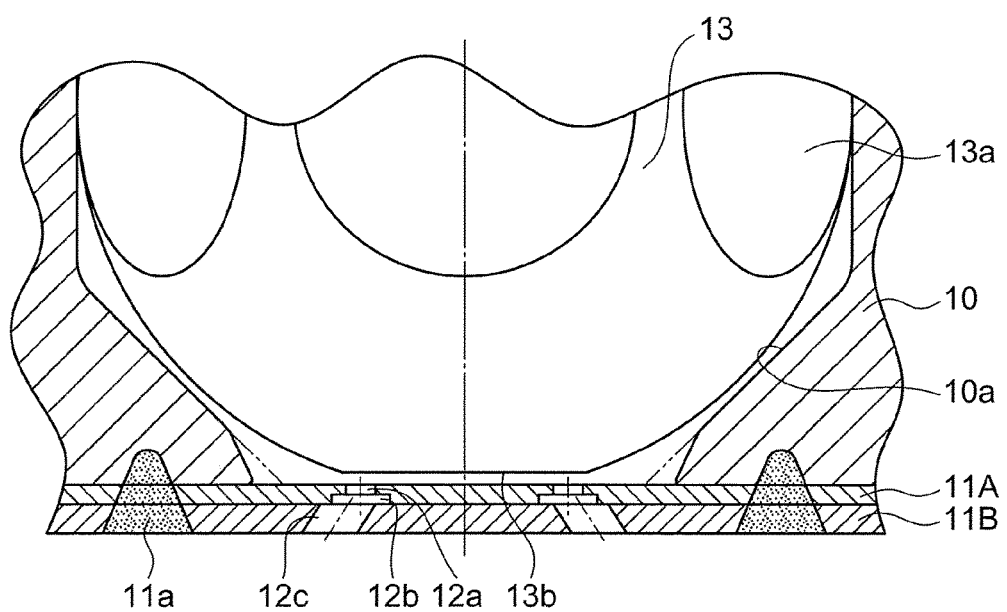
FIG. 13 is a sectional view illustrating a main part of the fuel injection valve according to a fifth embodiment of the present invention.

FIG. 13 is a sectional view illustrating a main part of the fuel injection valve 1 according to a fifth embodiment of the present invention.

In this embodiment, the first injection-hole portions 12a of the first injection-hole plate 11A are formed so as to be opposed to the flat portion 13b of the ball portion 13.

The remaining configuration is the same as that of the fuel injection valve 1 according to the third embodiment.

In this embodiment, a height from a position directly above the first injection-hole portion 12a to the ball portion 13 is small as compared to that in the fourth embodiment in which the first injection-hole portions 12a are formed on the outer side of the flat portion 13b of the ball portion 13.

Therefore, the flow from the directly upper part into each of the first injection-hole portions 12a can be reduced. Thus, an injection speed in an axial direction of the fuel injection valve 1 is lowered.

As a result, spray penetration can be lowered to reduce a rate of adhesion of the fuel before evaporation to an intake port. Therefore, controllability is improved.

Sixth Embodiment

Figure 14:
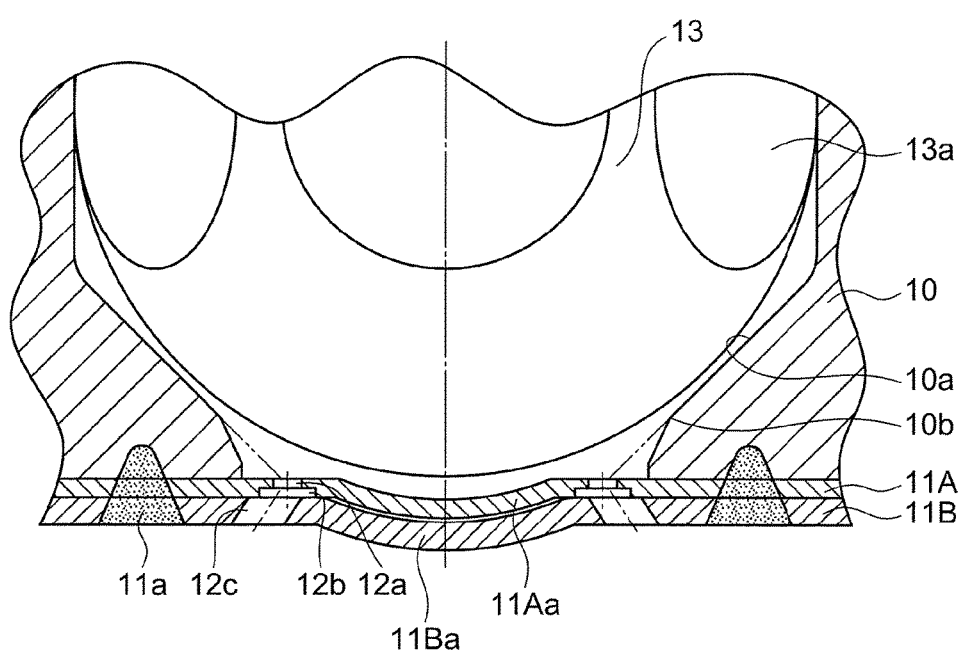
FIG. 14 is a sectional view illustrating a main part of the fuel injection valve according to a sixth embodiment of the present invention.

FIG. 14 is a sectional view illustrating a main part of the fuel injection valve 1 according to a sixth embodiment of the present invention.

In this embodiment, in center portions of the first injection-hole plate 11A and the second injection-hole plate 11B, recess portions 11Aa and 11Bb, each being separated away from a ball-shaped distal end portion of the ball portion 13 at a substantially equal distance, are respectively formed.

The remaining configuration is the same as that of the fuel injection valve 1 according to the second embodiment.

In this embodiment, similarly to the fuel injection valve 1 of the third embodiment, the evaporated fuel amount in the dead volume under a high temperature and a negative pressure can be reduced. Therefore, a change in injection amount (static flow rate or dynamic flow rate), which is caused along with a change in atmosphere, can be suppressed.

REFERENCE SIGNS LIST 1 fuel injection valve, 2 solenoid device, 3 housing, 4 core, 5 coil, 6 armature, 7 valve device, 8 valve element, 9 valve main body, 10 valve seat, 10a seat surface, 11 injection-hole plate body, 11A first injection-hole plate, 11B second injection-hole plate, 11Aa, 11Ba recess portion, 12 injection hole, 12a first injection-hole portion, 12b expanded portion, 12c second injection-hole portion, 13 ball portion, 13a chamfered portion, 13b flat portion, 14 compression spring, 15 virtual circle, 20 case, 21 connector, 22 fuel passage, I outlet-side opening of first injection-hole portion, II inner diameter-side inner wall surface, III inlet-side opening of expanded portion, VI portion of separation.

The invention claimed is:

1. A fuel injection valve, comprising:
a valve seat;
a valve element arranged so as to be opposed to the valve seat and being capable of reciprocating along a central axis line; and
an injection-hole plate body being fixed to the valve seat by welding and having a plurality of injection holes formed therethrough, so that a fuel passes through a clearance between the valve seat and the valve element to be injected through the plurality of injection holes, the injection-hole plate body comprising:
a first injection-hole plate having a first injection-hole portion and an expanded portion in communication with the first injection-hole portion, wherein, for each of the plurality of injection holes, the first injection-hole portion and the expanded portion have a same central axis extending in parallel, to the central axis injection-hole portion, and
a second injection-hole plate being-laminated on the first injection-hole plate on a downstream side thereof, in communication with the expanded portion and having a second injection-hole portion inclined from the expanded portion in a direction away from the central axis line toward the downstream side of the first injection-hole plate;
wherein an inner diameter-side inner wall surface of the second injection-hole portion at least partially overlaps an inlet-side opening of the first injection-hole portion, the inner diameter-side inner wall surface of the second injection-hole portion being proximate the central axis line,
an outlet-side opening of the first injection-hole portion is encompassed in an inlet-side opening of the expanded portion,
a minimum flow-path area of the first injection-hole portion for the fuel is equal to or smaller than a minimum flow-path area of the second injection-hole portion and a minimum flow-path area of the inlet-side opening of the expanded portion, and is smaller than a minimum flow-path area of the expanded portion, and
each of the plurality of injection holes is comprised of a combination of the first injection-hole portion, the expanded portion, and the second injection-hole portion.

2. The fuel injection valve according to claim 1, wherein the first injection-hole portion is formed to extend in a direction perpendicular to a surface of the first injection-hole plate.

3. The fuel injection valve according to claim 2, wherein:
the first injection-hole portion has a cylindrical shape; and
a difference between a plate thickness t of the first injection-hole plate and a height h of the expanded portion is less than a diameter D1 of the first injection-hole portion.

4. The fuel injection valve according to claim 1, wherein the valve element has a flat portion at a distal end portion, which is parallel to the first injection-hole plate.

5. The fuel injection valve according to claim 4, wherein the inlet-side opening of the first injection-hole portion is formed on an inner side of an innermost diameter portion of the valve seat and on an outer side of the flat portion.

6. The fuel injection valve according to claim 4, wherein the inlet-side opening of the first injection-hole portion is formed so as to be opposed to the flat portion.

7. The fuel injection valve according to claim 1, wherein:
the valve element has an arcuate surface at a distal end portion; and
the injection-hole plate body has a recess portion opposed to and separated away from the arcuate surface.

8. The fuel injection valve according to claim 1, wherein a central axis of the second injection-hole portion is inclined with respect to the central axis extending through the first injection-hole portion and the expanded portion.

9. The fuel injection valve according to claim 1, wherein the outlet-side opening of the first injection-hole portion overlaps an inlet-side opening of the second injection-hole portion.

* * * * *